United States Patent
Schmieg

(10) Patent No.: US 12,260,075 B2
(45) Date of Patent: Mar. 25, 2025

(54) METHOD FOR MODELING AND MANAGING DISTRIBUTED SYSTEMS

(71) Applicant: German Edge Cloud GmbH & Co. KG, Eschborn (DE)

(72) Inventor: Arne Schmieg, Burgwedel (DE)

(73) Assignee: German Edge Cloud GmbH & Co. KG, Haiger (DE)

( * ) Notice: Subject to any disclaimer, the term of this patent is extended or adjusted under 35 U.S.C. 154(b) by 0 days.

(21) Appl. No.: 18/328,043

(22) Filed: Jun. 2, 2023

(65) Prior Publication Data

US 2024/0370146 A1  Nov. 7, 2024

(30) Foreign Application Priority Data

May 3, 2023 (DE) .......................... 102023111472.7

(51) Int. Cl.
*G06F 3/04842* (2022.01)
*G06F 3/0481* (2022.01)

(52) U.S. Cl.
CPC ........ *G06F 3/04842* (2013.01); *G06F 3/0481* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 7,043,716 B2* | 5/2006 | Zimmer | ..................... | G06F 8/60 717/112 |
| 9,881,066 B1* | 1/2018 | Yousaf | ................... | G06F 3/0482 |
| 10,965,785 B2* | 3/2021 | King | ........................ | G06F 8/30 |
| 2003/0035006 A1* | 2/2003 | Kodosky | ............... | H04L 69/329 715/763 |
| 2010/0185961 A1* | 7/2010 | Fisher | .................... | G06F 11/324 713/1 |
| 2013/0335339 A1* | 12/2013 | Maunder | ............. | G06F 3/04817 345/173 |
| 2014/0143736 A1* | 5/2014 | Huang | ............... | G06Q 10/0637 715/854 |

(Continued)

FOREIGN PATENT DOCUMENTS

CN  116028563 A  4/2023

*Primary Examiner* — Daniel Rodriguez
(74) *Attorney, Agent, or Firm* — Harness, Dickey & Pierce, P.L.C.

(57) ABSTRACT

A graphical user interface display symbols for actuators and components for selection and creation of a graph by a user. The actuators represent resources of a provider, and the components include, as components of the actuators, technical implementations for interacting with programming interfaces of one or more providers of the resources, wherein the components are implemented as ontological classes that include declarative definitions of properties of the respective component; wherein, in response to selection of a new actuator by the user, the actuator is represented as a node in the graph, and wherein, in response to selection of a new component for an actuator in the graph, contact is made with the resource, and wherein the actuator and/or the components of the graph indicate technical properties of the resources as well as indicate user elements enabling the user to access the resources by means of functionalities of the components.

25 Claims, 6 Drawing Sheets

(56) References Cited

U.S. PATENT DOCUMENTS

| | | | |
|---|---|---|---|
| 2015/0370445 A1* | 12/2015 | Wang | G06F 16/986 |
| | | | 715/765 |
| 2015/0370763 A1* | 12/2015 | Wang | G06F 40/106 |
| | | | 715/235 |
| 2017/0102927 A1* | 4/2017 | Gunther, Jr. | G06F 8/38 |
| 2017/0201425 A1* | 7/2017 | Marinelli | H04L 41/12 |
| 2022/0075515 A1* | 3/2022 | Floren | G06F 3/04847 |
| 2024/0053877 A1* | 2/2024 | Du | G06F 3/0486 |

\* cited by examiner

METHOD FOR MODELING AND MANAGING DISTRIBUTED SYSTEMS

CROSS-REFERENCE TO RELATED APPLICATIONS

This application claims the benefit and priority of German Application No. 10 2023 111 474.7 filed May 3, 2023. The entire disclosure of the above application is incorporated herein by reference.

BACKGROUND OF THE INVENTION

Technical Field

The invention disclosed herein is in the technical field of distributed systems, particularly cloud and edge computing such as human-machine interaction for designing and controlling such systems.

Discussion

Under the term cloud computing, providers offer users the option of outsourcing their data and also technical processes to external data centers. In this process, users' data is stored outside the user's own storage resources and within a provider's storage resources, and users' processes run on the provider's servers instead of the user's servers.

In contrast to classic cloud computing, the term edge computing refers to the decentralized execution of technical processes and management of data. The storage and processing of data takes place closer to the source of data creation. Edge computing places increased demands on operations, since different storage and processing locations can offer different and possibly incompatible modes of operation and processing.

Access to or processing of data can be implemented both in cloud computing and in edge computing, for example, as software-as-a-service (Saas), platform-as-a-service (PaaS) or infrastructure-as-a-service (IaaS).

A user's interaction with a provider usually takes place via certain de facto standardized processes, for example, via web browsers, via command lines (shell), via application programming interfaces (API) or other software tools and applications, which serve as user interfaces for provider processes. Different providers typically use different processes, and access to and storage of data varies from provider to provider. Switching from one provider to another is not straightforward because data and processes are transferred between users and providers, but not between multiple providers. In addition, there is the challenge of managing resources together when the resources originate from different providers and/or when different technical measures are required to access the resources.

To address this shortcoming, standardization projects have been initiated to enable users to work independently of a provider. One example of such a standardization project is the Gaia-X project of the German and French ministries of economics, which is developing an "architecture of standards" that stands between providers and users and is intended to make users independent of individual providers through "interoperability". Gaia-X formulates certain interoperability requirements that must be met by providers in order to be integrated into Gaia-X. The requirements are described in detail below.

The implementation of such cross-provider mechanisms is technically complex, does not include many relevant cloud services, and does not cover a cross-provider operational layer (e.g., for ITSM automation & integration, billing, observability, data life cycle management, auditability, and many others). Furthermore, compliance requirements must be additionally considered, especially those based on the European Union's General Data Protection Regulation (GDPR) or the California Consumer Privacy Act (CCPA) or Privacy Shield of the USA. Cross-provider operational automation is another aspect not addressed by Gaia-X and similar interoperability initiatives. Existing solutions that enable access to multiple providers have thus far required specially tuned solutions and considerable development effort. The invention disclosed herein is based on the aspect of providing a solution that addresses these drawbacks.

SUMMARY OF THE INVENTION

Embodiments of the invention relate to a computer-implemented method comprising: Displaying a graphical user interface that displays symbols for actuators and components for selection and creation of a graph by a user, wherein the actuators represent resources of a provider, and the components include, as components of the actuators, technical implementations for interacting with programming interfaces of one or more providers of the resources, wherein the components are implemented as ontological classes that include declarative definitions of properties of the respective component; wherein, in response to selection of a new actuator by the user, the actuator is represented as a node in the graph, and wherein, in response to selection of a new component for an actuator in the graph, contact is made with the resource, and wherein the actuator and/or the components of the graph indicate technical properties of the resources as well as indicate user elements that enable the user to access the resources using functionalities of the components; and wherein, in response to the user selecting at least two actuators, user elements are displayed enabling the user to define a technical function to be performed by one or more of the selected actuators on one or more other of the selected actuators, and wherein the technical function is displayed as one or more edges between the actuators.

Further embodiments relate to a computer-readable medium having instructions stored thereon that, when executed by a processor, perform the method as disclosed herein.

DETAILED DESCRIPTION OF THE PREFERRED EMBODIMENTS

Overview

Figure 1:
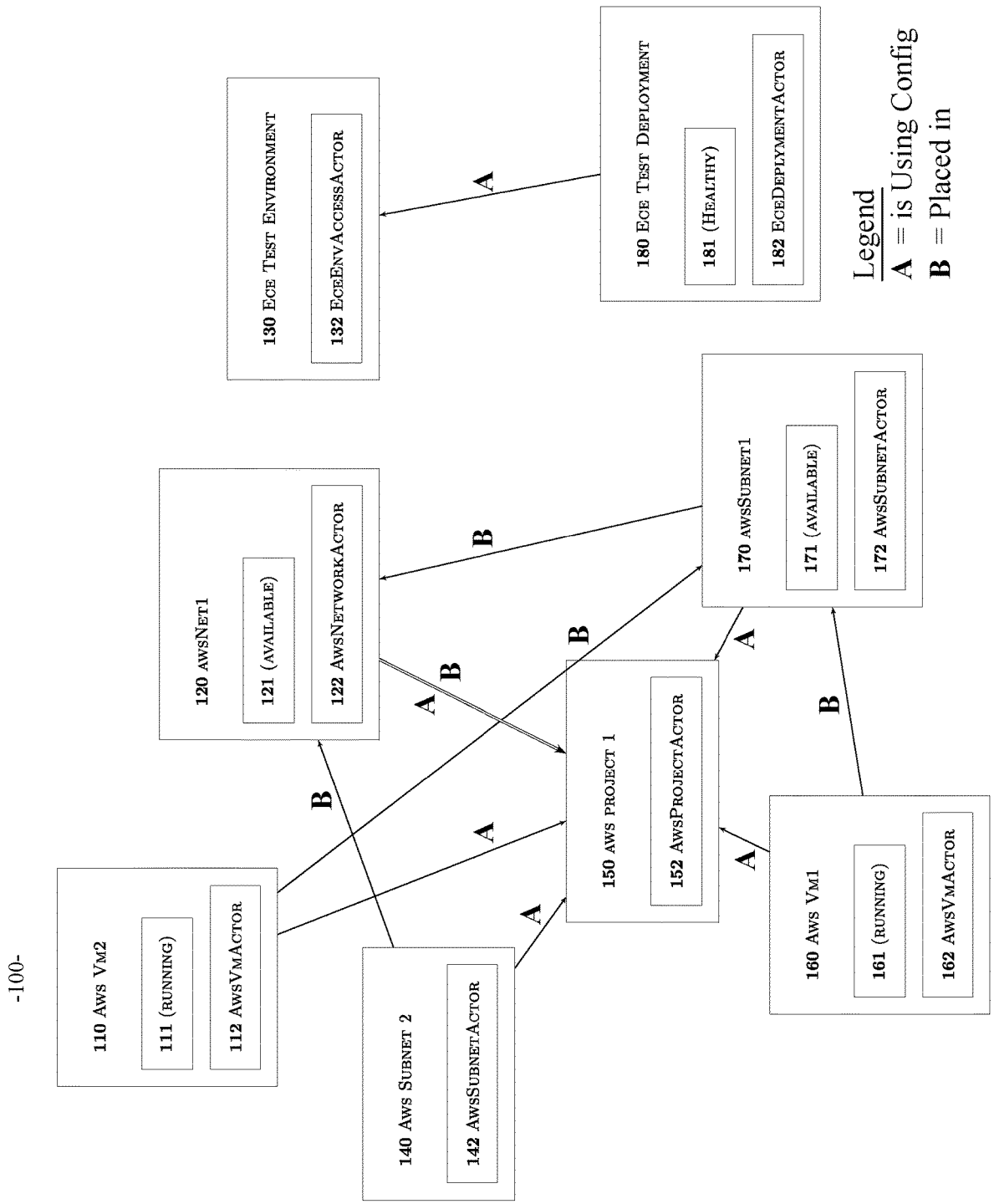
FIG. 1 shows a workspace of a graphical user interface according to one embodiment of the invention.

Embodiments of the invention include a method for providing and displaying to users at a computer, by means of a running application, a user interface for creating and editing a resource management infrastructure. Preferably, the user interface is a graphical user interface comprising widgets. Alternatively, however, the user interface may comprise a command set that provides commands that are entered into a command line on a console. As a further alternative, a command set may be provided whose commands are provided in the form of an API, and in this way can be integrated into any application. In particular, a graphical user interface is described below; however, all the widgets mentioned, such as lists, search masks, graphs, can also be implemented by means of a command line or by means of API functions. For example, a graph can be output on a command line as a list of nodes and edges, or in a hypertext format. User elements are widgets in a graphical user interface and may correspond to commands that list available options or items to choose from in command line based implementations.

The user interface includes user elements for the selection of actuators and components by a user. The user elements are, for example, lists, tables, search masks or the like. Actuators are, for example, data structures that represent physical resources, such as virtual machines (VM), servers, storage, or machines in a manufacturing plant. Components are ontological classes consisting of an ontological description of defined properties of the component. Examples of such properties are behavior (functions, actions, events), roles (access rights), graphical representations, skills, and data structures (states, data points, etc.). A purely ontological description is also referred to as a declarative description and can implement the properties of the component using various programming languages, especially declarative programming languages. In particular, components represent implementations of a particular functionality that can be used to access a resource, in particular a resource represented by an actor. The implementation may comprise, for example, source code or compiled code or a combination of compiled code and source code and may be implemented, for example, as a Function as a Service. The functionalities defined in the components comprise functions that can be freely defined using different programming languages or without using a programming language. The invention thus provides a language-independent type-safe distributed program. Actuators and components define an ontology by means of properties, actions and events, which sets the involved actuators and components in technical relation to each other and defines conditions between them.

Both the actuators and the components can be represented in the user interface as symbols or other forms of representation, such as identifiers. In one embodiment, actuators and components are part of an object-oriented implementation and are implemented as classes or, after instantiation, as objects. The graphical user interface is, for example, part of an application that shows the assembled actuators and components and their links and adapts them to real states of the underlying physical objects. The user interface is used to create, edit and display the running system.

By assembling, configuring and linking the actuators and components, the user develops a data and execution model with the help of the user interface, which models a real distributed system and its components at different levels of abstraction. The most abstract level contains the cross-provider properties (actions, states, etc.), while the lowest level contains the provider-specific properties. This data and execution model can be visualized in the form of a graph. The application gives the user the possibility to monitor and control the configured and running system.

When creating the data and execution model by means of the user interface, the user can make a selection from the predefined actuators and components by interacting with the user interface, for example by dragging and dropping the objects concerned (actuators/components) onto a workspace (canvas) of the user interface. Alternatively, the user can select an already predefined combination of actuators and components and load it into the workspace. In one embodiment, this combination is represented as a graph, with actuators and components contained therein forming the nodes of the graph and certain relationships between the nodes forming the edges of the graph, as explained below.

The components are displayed in the workspace as parts of respective actuators, whereby an actuator can contain several components. When selecting a component from a given list, table or the like and inserting the component into an actuator, the functionality of the component is added to the actuator.

After selecting an actuator, the user can configure it and specify the underlying resource, for example by means of a configuration dialog. The actuators to be selected already contain certain default values, for example basic definitions of a VM, which the user can further define by means of configuration. Similarly, the components that the user can select to include in an actuator contain basic implementations for accessing resources, for example, functions that can be used to control a VM. During configuration, the components can already establish a connection to the underlying resource, if the configuration of the actuator and components already allows this, and can indicate a state, for example the responsiveness of the resource, its utilization or similar.

Components

In particular, the functionality of the components enables interaction with a particular provider that provides the resource represented by an actuator. The association between a component and an actuator comes from the fact that the component is displayed in the user's workspace (user interface) as a component of the actuator. Interaction between the component and the provider occurs through an application programming interface (API) provided by the provider, whose commands can be invoked from the component.

Components that are available to the user for selection include components that have basic functionality that is not tied to a concrete provider. Other components have concrete functionality, i.e., commands from provider APIs, that is tailored to a concrete provider by including the commands from those provider APIs in the component. The user can select a component that is already displayed in the workspace and modify it, for example, to extend or otherwise change the functionality of that component. For this purpose, the application can display the code of the component in its current version in the user interface. The user can modify it in an editor or the like and compile and/or test it using relevant user elements (buttons, etc.). In one embodiment, a modified component can be added to the standard components provided by the application so that they can also be used for other actuators or new projects.

In one embodiment, each component that the user can select is an ontological class, a declaration of the properties of that component. When the user selects such a component for an actuator, a copy of the class is first automatically created. If the user does not modify this component further, the component represents a new instance (object) of the class; if the class is based on a compiled language, it can be compiled into an executable object in response to the selection, which is also immediately executed and interacts with the actuator and resource. If the user changes the component, for example via a configuration dialog or by editing the underlying code, a derived class is automatically created. In one embodiment, this can be copied either by the user (drag-drop or appropriate command) or automatically again into the selection list to be available for future component selection. The derived class is also considered an instance and, if necessary, compiled and executed.

The relationships between classes provided by the application can be illustrated in an ontology, which can be represented in the workspace of the application. Here, an ontology is understood to be a programming language-independent class hierarchy, where components themselves consist of declarative information about their properties (actions/functions, roles, data structures, skills, GUI representation), which can then be implemented in different programming languages. The declarative specifications include, for example, specifications about the functionality of the class, such as the use of the class to control an abstract or concrete (AWS, Azure) VM or to control a machine, to manage access rights of one or more users, and so on. For types of resources, such as memory, VMs, processors, respective ontologies can be displayed. For example, an ontology can display a base class and classes derived from it in the form of a tree structure. For virtual machines, for example, a base class "BaseVmComponent" can be displayed, which defines basic functionalities and configurations for VMs, such as starting and stopping the VM. Further classes derived from this class can contain advanced functionalities/configurations that are tailored to the VMs of concrete providers.

To create a new VM in a displayed graph, a user can select one of the classes from the displayed ontology and in this way invoke a dialog box that displays available configuration options, such as an address where a provider deploys the VM. In one embodiment, the user can select and configure the base class for VMs. Upon confirmation of the dialog by the user, the application can automatically determine which type of provider was specified by the user, can further check whether a derived class already exists for that provider, and, if so, instantiate the derived class to create and display an actuator and/or component for the configured VM. Determining appropriate classes includes evaluating all derived classes for similarity of the providers defined there to the provider specified by the user, such as its address. If a separate class for this provider does not exist, the application can instantiate the base class. This procedure can also be performed for resources other than VMs. Examining eligible classes may involve relating certain characteristics of the user—such as stored accesses to specific storage by that user, frequency and volume of accesses—to the available classes and selecting a class that most closely matches the user's needs. For example, it may be determined that the user prefers to access storage at certain times of the day and/or on certain days of the week, and may further determine classes that contain information about resources that can be accessed most conveniently and/or quickly at those times.

As mentioned, the user can invoke a dialog box by interacting with a displayed ontology. Alternatively, the user may invoke a dialog box within the graph, for example by actuating an input device when its cursor or pointer, etc., points to a particular point in the graph. In this case, the application can determine the context of the graph at that point and launch an appropriate dialog. For example, the user can select a point between two already integrated VM actuators or near a memory actuator and start the dialog. The application detects the actuators closest to the point and their types and displays a dialog that allows the creation of an identical or similar actuator (same type). In particular, this dialog can be configured on the part of the application with certain values that are not necessarily part of the corresponding class, but rather derived from the context. This may concern, for example, a size of a memory, a type of a VM or a processor, or similar. In addition, the creation of a new actor may be limited depending on the context. The application may have preset rules defining which types of actuators and which configurations of actuators are compatible with each other, and may check which dialogs can be offered to the user at all in a chosen context, and may display only those.

The mechanism described with respect to an ontology and the associated inheritance and reusability in components and actuators is independent of the specific programming language or other interface that a component uses to access a resource. Thus, a first component for interacting with a resource may be written in a scripting language and include a module that is copied and executed, or may be written in a compiled language, while a second component for interacting with another resource of the same type (VM, processor, etc.) uses other languages; nevertheless, classes for two resources of the same type may be derived from a common base class. The invention provides an inheritance hierarchy that ranks the components regardless of the language used, copying them as needed and, if necessary, considering them as derived classes that, once created, are made available again to the user by inclusion in selection lists or the like.

In addition to the described inheritance and reusability of components/actuators or their underlying classes, the invention includes the use of defined relationships between components/actuators. In addition to the described inheritance resulting from the derivation of classes, the invention additionally comprises the possibility to provide components/actuators by the user or even automatically during initialization with properties (attributes, etc.) of the components/actuators which are subject to inheritance. In particular, such changes of properties can be transferred directly to further components/actuators which are connected by a changed component by means of relations and/or by means of inheritance. The application in which the components/actuators run and are represented can decide independently which of the changes are to be transferred. For example, a transfer of a change into a component can be omitted, if a changed attribute or a function in the component does not exist (more) at all.

As already mentioned, the components can provide different functionalities. An example of a functionality is the provision of certain VM functions. Such a component is suitable, for example, in conjunction with an actor that represents a VM. The VM functionality may be aligned with an API of a particular provider, such as AWS or Azure. An example of a VM functionality is a backup function, for example to store a state and/or data of the VM as a backup.

Components can have a specific data type, as well as attributes or variables that represent, for example, a state, input and output values and their data formats, energy or battery consumption, and other information about their functionality.

The totality of the properties defined in a component-functions, attributes, events and actions and also the technical relationships to other components/actuators-means that the component is self-describing in the sense that a declarative description of these properties can be generated from the component. The properties of components and/or actuators are normalized in the sense that properties of different actuators/components use uniform data types. Thus the properties can be transferred and used from component to component.

Actuators

As already explained, actuators represent specific resources, for example, a VM. Actuators can also represent specific users and serve to specify rights to resources. Another example is the provision of an actuator to define rights for a resource. Such an actuator may include a (modifiable) list of users that are allowed to access that resource, and/or may include a list of users that are explicitly not allowed to access it. In one example, the actor may define a virtual network and access restrictions to the network or parts thereof, and may include information about access rights to those parts.

In addition, actuators can stand for physical or virtual objects in general, including users, rights and processes or programs.

The functionalities represented by components can be related to each other to define certain technical interactions. In contrast, actuators can be related to each other only indirectly, namely via relations of their components. A relationship between components has an attribute that explains the nature of the technical relationship, for example, "A is connected to B", "A stores B", etc. Another example concerns actuators in a manufacturing plant, where each actuator stands for a respective device of the plant and where the relationships of the actuators indicate from which actuator another actuator receives its inputs and to which actuator it delivers. In a graph, the relationships between components or between the actuators containing these components represent the edges; the actuators are the nodes of the graph.

The definition of a relationship for two components and/or actuators by a user can be supported by the application. For example, when a new relationship is created, the application behind the user interface automatically determines existing attributes of the entities (components/actuators) involved and, depending on these attributes, generates actions and/or code suitable for the attributes. For example, for this purpose, the application can access a table that assigns certain values of attributes to certain actions or code and, based on this table, selects suitable actions/code and adds them to the entities (components, actuators) involved or displays them to the user for selection. For example, if the user selects a relationship between two components whose attributes denote a VM and a storage device, the application automatically selects an appropriate relationship type, such as a relationship that defines the use of the storage device as the VM's memory. In addition, the application selects appropriate code that provides access to the storage device as the VM's memory. From the attributes of the entities involved, the application can provide relationship definitions that define one of the actuators as the source of inputs from the other actuator, or vice versa.

In general, the application can also support the selection of relations by restricting the possible selection of relations for two selected entities from the outset to those relations that are technically eligible for the attributes of both entities, for example by restricting them to compatible types of the involved actuators, components and relations. Other relations are not displayed for the selected units, so that the user is supported in his selection.

The described representation of components, actuators and their relations among each other results in a directed graph on the workspace of the user interface, whose nodes are the actuators with components contained in them and whose edges are the relations between actuators and components, respectively.

The properties of components/actuators can be queried using a query language. This language provides commands that can be used to identify components and/or actuators that fulfill a certain property. In one embodiment, the user enters such a command using an input mask. The application then determines the components of the graph that satisfy the property and highlights them graphically or displays a list of them. For example, a command may include a query for all actuators that generated certain costs (more or less than N euros, between M and N euros, etc.) in a past period (last week, last month, last year, last N days, etc.) and are below a certain scope (explained below).

The components of different actuators communicate with each other by means of actions and events. Actions are operations or procedures that actuators can call and execute on components. For example, actions are methods that are implemented in components and are part of an API of the components. Examples of such actions include starting or stopping components and the resources behind them, for example, a VM or a machine, or connecting a resource over a specific network (represented by one of the involved actuators). Events are messages that are triggered at the technical level when a predetermined condition is met, such as a specific change in a component or actuator. Events are communicated to previously registered observers, which are themselves actuators or components. An example of an event being triggered is the deactivation of a VM or an error status of a machine in a manufacturing plant. Observers of such events can perform certain actions in response, such as suspending or deactivating certain processes that depend on the functionality of an affected component, or even notifying a user.

As described earlier, actuators comprise one or more components. An actuator can be created and edited by a user by selecting an appropriate class; the user can further add components to the actuator. Also, a selected actuator class may already have one or more components. Alternatively, the user can create an actuator by selecting components alone ("composition pattern"). According to this concept, an actuator is already formed by a user combining two or more components, for example, by selecting several components to a common object (Dragndrop of component classes on the workspace and selection of the components by means of selection tool). Induced by this merging of several components, the application automatically creates an actuator of a type (class) that results from the selection of the components or is compatible with them. In one example, the application can determine the types or classes of the components and determine one or more actuators from given actuators that contain components of these types. If multiple actuators are available that meet this criterion, the user may be prompted via dialog to select one of these actuators. Alternatively, the user can be prompted to select an actuator if none of the available actuators meets the criterion.

Roles

Actuators are associated with specific roles. A role is the definition of an action that an actuator can apply to other actuators. The application and user interface disclosed herein provides means to define and store roles between actuators. To this end, the user interface can display predefined roles for the user to select, and the user can assign them to specific actuators. An example of a role is a definition "A can modify and delete B". Applied to a first actor (actor A) representing a user of the user interface and a second actor (actor B) representing a VM, the user of the user interface thus defines modification and deletion rights for the user for the affected VM. Another example is a definition "A can only see B". Applied to two actuators, the first actuator's right to the second actuator is restricted to only viewing the second actuator (read rights), but not modifying or deleting it (write rights).

A role selected for an actuator and assigned to this actuator can be further modified by the user, for example by entering a command or using an input dialog. The modified role can be added to the roles provided in the user interface and is then available for use in other actuators and also new projects or applications.

An actuator may have multiple roles and perform them depending on the appropriate context. In one embodiment, adding a role to an actuator includes automatically checking for conflicts with other roles of the actuator. For example, it may be determined whether rights assigned by a role conflict with other rights. In this case, the assignment of the new role is rejected and a corresponding message is displayed or transmitted to the user.

Scopes

In one embodiment, the selection of roles for actuators can be supported or even fully automated. For example, the process can check the relationships already defined for an actuator or its components and, based on these relationships, suggest or automatically assign roles for the actuator. For example, a relationship that defines a first actuator as the storage medium of a second actuator can lead to the automatic selection of a role that enables read and write accesses to the first actuator by the second actuator. Each actuator is associated with an owning actuator called a scope. If the settings of such a scope are changed, the application automatically transfers these changes to the actuators of this scope, provided that the change is technically reasonable for the respective actuators; for example, it is first checked whether an attribute changed in a scope is present at all in an actuator that depends on this scope.

In one embodiment, the user can define access rights to resources using actuators and components. An actor can be created that defines the rights assignment for a resource, for example a VM or a database. In this resource, a first component or actuator can be created as a scope, which on the one hand defines an access right to the resource in a certain scope and on the other hand specifies one or more users who can use the resource in the certain scope. Within this component, other components can be created, which in turn define access rights to the same resource as well as users to whom these access rights apply. However, these access rights cannot be more extensive than the access rights of the user or users specified in the parent component, nor can the scope of the defined resource be larger than specified in the parent component. Multiple child components with user and resource definitions can be created in the parent component, and the child components can independently define rights to (areas of) the resource as well as access rights for different users. However, for all child components, the access rights are not more extensive than those of the parent component. If one of the specified users accesses the resource, only the defined part of this resource is displayed to him.

In one embodiment, a role can be automatically assigned to actuators. An example is an actuator that represents a task to be performed by a support service provider, such as an actuator labeled "support ticket" or the like. For example, such an actuator may be created automatically in response to a request from a user during interaction with the running application; for example, the user indicates through a user element that he or she needs help using a database. The "Support Ticket" actuator can be automatically assigned to another user who works for the support service provider and is represented in the user interface by its own actuator, such as an actuator labeled "Support User." This assignment of one actuator to the other may include assigning a role to the "Support User" actuator, where the role allows accesses to the database specified by the "Support Ticket" actuator as an action—this may include both the permissible rights and the required action, i.e. a process or code, to access the database. In this embodiment, the database is itself represented by an actuator, such as an actuator labeled "Postgres DB" or the like. Thus, a total of three actuators are involved, with a first actuator triggering a role assignment by a second actuator to a third actuator. This assignment can be created by selecting the role as well as the affected actuators, namely the triggering actuator ("Support Ticket"), the exercising actuator ("Support User") and the actuator affected by the exercise of the role ("Postgres DB"). For this purpose, an input dialog can be displayed to the user for creation, which allows a selection of the involved actuators and the conditions-here the assignment of a ticket to a support user. The role can be fulfilled and closed by interacting with the "Support User" actuator and the "Postgres DB" actuator and then automatically removed again, for example as a response to an event triggered by one of the actuators indicating that the ticket has been closed.

With further reference to the above example for managing tickets, the application can be integrated into existing ticket systems by means of connectors. If such a connector is defined, the application can also create a ticket in response to a ticket created by means of an existing ticket system and define the definitions of the actors involved described above or assign and execute their roles. In individual cases, the automatic assignment of roles to actuators may be accompanied by interaction with the user, for example, if the assignment of a particular role to a particular actuator requires certain rights. For this purpose, the application can basically check before each role assignment whether the assignment involves an extension of previously assigned rights for the involved actuators, and can display a corresponding question to one or more actuators. Only if this question is answered positively, for example by means of a suitable user element, is the role assignment continued.

Properties

Properties include attributes and functions of a component or actuator and the relationships between them. Properties are subject to inheritance when one class is derived from another, when a new component or actuator or its underlying class is created, and are subject to inheritance at runtime when an "owning" actuator (scope) is changed; in the latter case, a change of a property in an owning actuator to which other actuators are assigned—for example, by way of a relation or a role—affects the other actuators, provided they define a corresponding property.

Relations

Relations are relationships between actuators and/or components that are illustrated as edges in the graph. A relation can define a dependency between actuators/components and, for example, cause the transfer of changes of an actuator/component to the dependent actuators/components. Relations allow queries between actuators and/or components, where the queries concern the properties of the actuators/components in question. Relations can further be used to define the rights of an actuator or component in question. The relation defines rules that specify how changes to an actuator/component affect another actuator/component. For example, deleting an actuator/component can lead to the deletion of all actuators/components that are in a relation with it. Alternatively, the very existence of a relation between two actuators/components may prevent one of them from being deleted. Furthermore, a graph can be arranged based on its relations in the graphical user interface by aligning the actuators based on the relations. Such an example is disclosed below with reference to FIG. 3.

The following is sample code for an "AwsVMActor" actuator that contains two components. The concrete syntax of all code examples shown here is not binding and should only serve as an example.

```
typeName: actor
specialIcon:
id: icn_node_instance_dark.svg
   components:
- name: VmComp
component: AwsVmComp
   - name: K8sResourceComp
component: engine.one.cloud.integrations.k8s.K8sResourceComp
```

The sample code contains an actor of a generic type "actor". The type is designated here by the "typeName" field. The actor is displayed in the user interface with an icon stored in the "icn_node_instance_dark.svg" file, which is defined by the "specialIcon" and "id" fields, respectively. The components are named as "VmComp" and "K8sResourceComp" and with a respective type "AwsVmComp" and "engine.one.cloud.integrations.k8s.K8sResourcecomp". The actor is used to represent and access a VM of the provider "Aws".

An example definition of the "VmComp"/"AwsVmComp" component is shown below. The component is derived from a base class "BaseVmComp" ("parent" field; sample code below) and includes an implementation tuned to access the VMs of the provider "Aws".

```
typeName: component
parent: engine.one.cloud.core.resources.compute.vm.BaseVmComp
   implementedEvents:
- event: engine.one.cloud.integrations.k8s.K8sCrdChangeEvent
method: handleCrdChange
registration:
actor: sameActor
   properties:
- name: subnet
type: AwsSubnetComp
autoRelations:
- relation: engine.one.cloud.core.relations.PlacedIn
direction: in
   - name: accountSettings
type: AwsAccountSettingsComp
   methods:
- name: OnCreate
   - name: UpdateVmStatus
   ux:
category: developer
repeatable:
intervalInSeconds: 30
```

The component defines under the field "implementedEvents" an event/an event to which this component can react. The identifier "engine.one.cloud.integrations.k8s.K8sCrdChangeEvent" in the "event" field defines the name of the event. The "method" field specifies a routine "handleCrdChange" that will be executed when the event occurs. Under the "registration:" field, you can set whose events the component responds to; in this case ("sameActor"), the component responds only if the event is triggered by the actuator that contains the component. An alternative value would be "SameParentScope" and would mean that the component responds to all events of the designated name that are fired within the same scope "above" the component. Another alternative would be "ChildScopes" and defines that the component will respond to the event whenever it is fired from "below" the component. The counterpart to "implementedEvents" is "sendAbleEvents" (explanation below).

The properties of the component are defined under the "properties" field. A first property concerns a relation with another component named "subnet" of type "AwsSubnetComp". The type of the relation is specified as "engine.one.cloud.core.relations.PlacedIn" and defines that the VM defined by the component "component" is located within the subnet of the component "subnet". By "direction: in" the direction of the relation is specified, thus the arrangement of the VM in the subnet, and not vice versa.

Another property concerns an "accountSettings" component of the "AwsAccountSettingsComp" type. This component type is used to specify account information required to access Aws.

The component also defines two sample methods. A first method named "OnCreate" is called once when the component is instantiated. Alternative method names would be "OnDestroy" (called when the component is deleted) and "OnChange" (called when the component is changed). A second method called "UpdateVmStatus" is called at 30 second intervals and updates the status of the component.

Below is a sample code for the "BaseVMComp" component, from which the AwsVmComp explained above is derived.

```
typeName: component
parent: BaseComputeComp
abstract: true
methods:
   - name: Start
   ux:
      category: mainActions
   - name: Stop
   ux:
      category: mainActions
   - name: StopForced
   ux:
      category: mainActions
```

This component is also derived from a base class "BaseComputeComp" and defines methods "Start", "Stop" and "StopForced", which are executed on start, stop and forced stop respectively.

The "AwsVMActor" actuator explained above contains, in addition to the AwsVmComp component, the K8sResourceComp component, whose sample code is reproduced below.

```
typeName: component
sendAbleEvents:
   - K8sCrdChangeEvent
properties:
   - name: deleteResourceOnDestroy
   type: boolean
   disableOnChange: true
   optional: true
   ux:
      category: developer
      hideInCreate: true
   valueRules:
      defaultValue: true
   - name: resourceData
   type: K8sNamedResourceData
```

```
        disableOnChange: true
        optional: true
        ux:
            category: developer
            hideInCreate: true
    - name: lastReceivedState
        type: jsonObject
        disableOnChange: true
        optional: true
        ux:
            category: developer
            hideInCreate: true
    - name: clusterSettings
        type: K8sClusterConfigComp
        disableOnChange: true
        ux:
            category: Target Settings
            hideInInspector: true
        autoRelations:
            - relation: UsingConfig
                direction: in
methods:
    - name: CreateNew
        inputs:
            - name: obj
                type: jsonObject
        ux:
            hide: true
    - name: CreateUsingExisting
        inputs:
            - name: resourceData
                type: K8sNamedResourceData
        outputs:
            - name: obj
                type: jsonObject
        ux:
            hide: true
    - name: Get
        outputs:
            - name: obj
                type: jsonObject
        ux:
            hide: true
    - name: Patch
        inputs:
            - name: partialSpec
                type: jsonObject
        ux:
            hide: true
    - name: Delete
        ux:
            hide: true
    - name: OnDestroy
    - name: DebugClear
        ux:
            category: developer>>actions
    - name: CheckResourceState
        ux:
            category: developer>>actions
            repeatable:
                intervalInSeconds: 30
```

This component defines an event "K8sCrdChangeEvent" in the field "sendAbleEvents", which can be triggered by the component. The field sendAbleEvents thus forms the counterpart to "implementedEvents" and offers other components the possibility to register for the event K8sCrdChangeEvent in order to execute a method when the event is triggered. The actual definition of the event K8sCrdChangeEvent can look as follows.

```
            typeName: event
            parameters:
                - name: changedData
                    type: jsonObject
```

This definition specifies parameters and data that are transmitted when the event is triggered and can be used by registered recipients of the event. The following code is included in the K8sResourceComp component:

```
        - name: clusterSettings
            type: K8sClusterConfigComp
            disableOnChange: true
            ux:
                category: Target Settings
                hideInInspector: true
            autoRelations:
                - relation: UsingConfig
                    direction: in
```

The defined clusterSettings enable other actuators/components to access the K8sClusterConfigComp component in order to read in and adopt configurations of the K8sResourceComp component. In particular, to the relevant actuators/components automatically generated. These automatically generated relations are of type "UsingConfig" and cause changes to the VM of the AwsVMActor actuator to be transferred (propagated) to the actuators/components concerned and used there. The K8sClusterConfigComp component can restrict access to configurations by means of further declarative specifications. The "UsingConfig" relation can be defined as follows.

```
            typeName: relation
            inName: is Using Config
            outName: is Config of
            out:
                preventDestroy: true
            in:
                uiHint:
                    type: GroupBy
                    priority: 195000
```

The definition "preventDestroy: true", combined with the direction "out" of the relation, prevents an actuator or component whose configuration is used by means of such a relation from being deleted. In this way it is prevented that an actuator/component, which uses configurations of other actuators/components, accesses undefined or deleted values.

With "uiHint:" and "type:" hints are given to the user interface for grouping the actuators/components affected by the relation. In the case shown, a priority is specified, the value of which is to be used to arrange the actuators/components concerned accordingly, for example by showing actuators/components with a higher priority further up or alternatively further down than others. In such an arrangement, relation arrows between the actuators/components can be dispensed with.

Access rights for actuators and components are defined, as already mentioned, based on their relations to other actuators/components. Without such relations, actuators/components can be granted certain default access rights when they are created, which are predefined in the class, for example. The access rights can be restricted in the higher-level component (in terms of the relation) by means of certain declarations; this is particularly advantageous for certain components that are higher-level to numerous other components in the role of a scope actuator. An example of such a restricted "ScopeComp" component is given below.

```
typeName: component
id: engine.one.system.ScopeComp
allowCompEdit: [ MembersEdit ].
allowCompUse:
allowCompView: [ MembersView ]
allowCompRemove:
methods:
  - name: InviteNewUser
    allowUse: [ MembersEdit ]
    inputs:
      - name: email
        type: string
      - name: roles
        type: RoleComp
        collection Type: Array
    outputs:
      - name: actor
        type: Actor
  - name: AddOrUpdateActorScopeRight
    allowUse: [ MembersEdit ]
    inputs:
      - name: actor
        type: Actor
      - name: roles
        type: RoleComp
        collectionType: Array
  - name: RemoveScopeRight
    allowUse: [ MembersEdit ]
    inputs:
      - name: actor
        type: Actor
  - name: GetMembers
    allowUse: [ MembersView ]
    outputs:
      - name: members
        type: ScopeMemberStruct
        collectionType: Array
```

The "allowCompEdit" field defines by means of "MembersEdit" that actuators/components that have been assigned the role of a "Member" are allowed to edit the parent component "ScopeComp". Similarly, actuators/components with this role are allowed to view the component due to the "allowCompView" field. The ScopeComp component further contains methods "AddOrUpdateActorScopeRight", "RemoveScopeRight" and "GetMembers", which define further functions regarding the "Members" of this Scope-Comp component and whose function already results from the respective designation. The respective "allowUse" field defines for each of these methods the access rights required so that "Members" can execute the respective method.

The code examples shown illustrate, among other things, that actuators comprise components and that the components can, on the one hand, be derived from other components within a class hierarchy and, on the other hand, derive configurations and properties from other components or actuators. The invention thus realizes the concept of inheritance both in the class hierarchy and at runtime between instantiated objects (actuators/components) that depend on each other in the form of roles and relations.

OTHER EMBODIMENTS

A particular embodiment of the invention disclosed herein relates to the implementation of a "time machine" for the application described above. In this embodiment, the history of creation and/or editing of the infrastructure visualized in the user interface is illustrated. Creation and editing are initially the responsibility of the user, but are subsequently subject to automatic adjustments. For example, an actor representing a VM may be removed or deactivated or moved when it is migrated or shut down. In addition, relations that exist from the actuator to other actuators can be automatically adjusted, in particular removed or deactivated or updated. Furthermore, changes in the properties of an actuator or component can automatically affect their scopes—i.e. the "owning" actuator displayed by means of relations.

As explained earlier, the user interface disclosed here preferably represents a graph whose nodes illustrate actors and whose edges illustrate roles and relationships. This graph evolves during its creation and editing. The nodes of the graph illustrate operational changes (states) of actuators, components and roles. All changes can be logged together with timestamps. The resulting log may be implemented, for example, in the form of a database that stores, for each timestamp, all components of the graph and their properties—in one embodiment, only the changes logged since the last timestamp—and may subsequently be used to illustrate the history of changes to the graph, and thus to the underlying resources, in a video or other image sequence. Here, the state of all visible components of the graph at each available point in time is reconstructed based on the entries of the log, and the graph in these states is presented as an image sequence, for example as a playable video or a scrollable image sequence. This offers a viewer the possibility to jump specifically to a certain point in time, for example to examine a certain state of the application/graph. Parallel to the image sequence, certain evaluation data, for example transmission rates, energy consumption, cost development, can be shown in diagrams, with the measured data being displayed over a time axis; in this way, the user receives an overview of past points in time that are favorable from his point of view and can select these specifically in order to jump to the corresponding point in the image sequence. In this way, the user is supported when searching for errors or also when reversing certain changes. In this case (unwinding), the application can use the user interface in response to a corresponding user command to restore the state of the application at the relevant selected point in time in the video, so that the user can continue to develop the application from this state. If the user jumps to a point in time and evolves the graph from there, these new changes can also be logged, creating a branched log: the first branch includes changes between the point in time and the first version of the graph, and the second branch includes changes between the point in time and the next version. Multiple back and forth jumping results in a multiple branched data structure (tree). In one embodiment, this can be displayed to allow the user to jump to specific branches and points in time, thereby placing the application in an appropriate state.

With further reference to this embodiment, the user can save a current state or a past state at any time without changing the current operation, and can load and apply saved states to the application at any time. For example, if the user interface/graph represents specific parts of a building system-blind, heating, light, window, or other actuators-a current state of those actuators-open/closed, temperature, brightness, tilted/open/closed, etc.—may be stored.— can be stored. If this state is loaded at a later time, the building technology controls the physical parts of the building so that they assume the stored values.

In one embodiment, access to past states of the graph may be implemented using a custom query language that provides corresponding commands. For example, a command may be provided that determines the changes of predetermined or all actuators and/or components in a predetermined time period. Such a command may further capture the changes in certain properties/properties of the actuators/components, for example, the costs incurred during the time period for the predetermined actuators/components, the energy consumption incurred, the activity (transmission rates, operations per second), and the like.

Another particular embodiment concerns the conditional implementation of changes resulting from interactions between actuators. The application may enter into a dialog with a user during operation when certain changes are pending or have already been made, in order to obtain permission or subsequent confirmation for the change and either make or retain it or restore the previous state. Permission or confirmation may be required if the change conflicts with certain states. For example, the application may include actuators or components that define access rights to certain resources, and may monitor access attempts to those resources. If an access attempt conflicts with access rights, a user may be prompted for confirmation or consent to the specific access, or even an extension of access rights for the originator of the access. Other examples of monitored changes include the occurrence of new ports on resources, the writing of amounts of data that cause limits to be exceeded and thus costs to be increased, a battery-powered resource falling below a defined battery charge level, etc.

Such an input dialog takes place via suitable user elements. In addition to a button for confirming or rejecting a change, these can also contain images of the graph. The images preferably include the state of the infrastructure before and after the change. If the change had not yet occurred, the graph showing the state after the change may be hypothetical and merely reflect a prediction. This may be done, for example, by instantiating the entire running process a second time and applying the changes to that second instance. In one embodiment, the user's response to the dialog may be used to guide future dialogs. For example, the dialog may be shown for the first time before a change is applied, and if confirmed by the user, may be shown the next time only after the change is applied, and may be omitted altogether if there are still further changes, with the further changes being applied by the process without dialog. If a change of a certain type (same actuator, same role, etc.) is repeatedly rejected by the user (rejected more often than a given threshold value), a dialog and also the change can be dispensed with altogether.

Another particular embodiment concerns automated troubleshooting. Here, the running application continuously monitors individual actuators or even entire sub-areas of the graph for malfunctions. For example, individual actuators or sub-areas may "freeze", i.e. no longer respond to events or actions, or require excessive memory and/or processor power. Such symptoms can be detected, for example, by monitoring system resources (memory, processor) and process identifiers (Process ID). The application can counter such symptoms by informing a user, for example via a dialog, and/or by terminating and restarting the affected area of the process via user command or automatically.

With further reference to automated troubleshooting, in one embodiment, this can be done with delay. Thus, in addition to the explained symptoms, the application also observes the overall activity of the mapped resources. Typically, system workloads of this type occur more frequently and more heavily at certain times (times of day and days of the week) than at other times. Therefore, in one embodiment, when a fault is detected, the application schedules the upcoming changes for a time outside of such busy periods. Such a time may be specified in the aforementioned dialog and may be changed by the user, for example to cause the change to be executed immediately.

Another particular embodiment concerns the consideration of certain requirements and preferences for actuators. Requirements and preferences can be defined by users when creating or editing an actuator and can be stored in the actuator in the form of attributes. An attribute in this embodiment may be, for example, a machine-readable and -interpretable rule or condition. During operation of the application, the actuators are instantiated. In the course of this instantiation, or even during their creation, the application identifies providers that meet the requirements and preferences of each actuator. In one example, a requirement concerns the cost of provisioning a VM, such as "cost below 10 USD." Subsequently, the process can search for vendors that meet this requirement. In particular, a single process may run multiple VMs from different vendors depending on which requirements are defined, which vendors meet those requirements, and which vendors are chosen if no requirements are stated at all. Requirements and preferences may differ in that requirements must be met unconditionally and corresponding actuators cannot be instantiated if necessary, and preferences are simply a priority for vendors to be chosen. An example of a preference is the specified goal of using certain energy sources, defined for example as "prefer green energy". Subsequently, the process will preferentially select appropriate providers if they provide information on such preferences. Multiple requirements and/or preferences can be combined in each actuator.

Another particular embodiment concerns an operation of single or multiple actuators in real-time. For this purpose, actuators may be placed in a real-time mode-either on explicit user command or automatically due to increased interaction of the actuators with other actuators—and then migrated to a separate execution system. In one embodiment, this is a local system with a processor that meets predefined requirements for real-time operation. Actuators, upon entering a real-time mode, may adapt their behavior to meet the real-time operation requirements of the underlying processor. For example, an actuator may time constrain operations that involve communication with other components/actuators within the requirements. In particular, an actuator may limit a waiting time of an interaction with other actuators/components to the maximum allowable value derivable from the requirements.

Another particular embodiment relates to the representation of the locations of actuators in terms of virtual/augmented reality (VR, AR). Actuators or their components can run as respective processes on different processors and different devices or server farms. To represent such a location together with actuators running on it, an overview of a building, a server farm or several devices can be displayed. A map can also be used if the processes are running on devices in different buildings. Actuators can be displayed as symbols within such overviews and arranged in an overlay over a map according to the position of their resources at locations (buildings) on the map. Actuators can be provided with indications of their location of operation, for example, when they are instantiated and when they migrate to other locations. These indications are preferably adjusted by a higher-level process (for example, a VM manager). Arranging actuators with respect to corresponding locations on the map may be implemented in one embodiment by adding a component to the actuators, the component having functionality for locating the resource underlying the actuator, determining a corresponding coordinate on the map, and arranging the actuator over a corresponding point on the map.

The display of such locations can assist users in locating faults in those cases where external influences (overheating)

are responsible for faults. Embodiments also include augmented reality representations, wherein a user filming a manufacturing or other facility with a smartphone or other mobile device is shown the properties (components, relationships, etc.) of the filmed objects available from the actuators of his application as an overlay. In particular, the status, for example a malfunction, of such an object may also be displayed, so that the user is greatly assisted in searching for errors. Additionally or alternatively, processes running on the filmed object may also be displayed, for example as highlighted attributes or other properties of an actuator of such object. In one embodiment, the application disclosed herein may assist the user in migrating the use of data and/or functionality from one resource to another. For example, the user may decide to move data from one memory to another memory and delete the data on the first memory, or may move data and/or processes from one VM to another VM and stop the first VM, or may pull processes from one processor and start them on another processor. Such migrations may be performed by the user, in one embodiment, by selecting a first actuator to migrate from and selecting a second actuator to migrate to. The selection may be performed by means of an input device and may be performed, for example, by marking two actuators, such as by dragging a rectangle on the displayed workspace, where the rectangle is stretched between two points and covers the actuators to be selected. In response to such selection, the application can control the migration process using dialog boxes and input from the user. For example, the application may prompt the user for input in which the user determines which of the actuators is the source of the migration and which of the actuators is the destination. The application may further determine the data and processes owned by the user that reside on the first actuator; this is done via relevant procedural steps defined in a corresponding component of the actuator, which the component uses to communicate with the resource.

The actual migration is performed by extracting the data/processes stored in the first actor or its resource. For this purpose, the application can recreate the class from which the first actuator was instantiated, or alternatively, it can re-instantiate the class from which the second actuator was instantiated. The data or information about processes (configuration) is copied from the first actuator to the newly instantiated class and deleted or stopped on the first actuator; these actions are applied by the first actuator to its resource. The new instantiated class thus created serves as an intermediate resource for passing the data/processes to the second actor. In one embodiment, the instantiated class can be transferred to the class of the second actuator via typecasting, provided that these classes are compatible, i.e., derived from each other. The data/processes can then be moved to the second actuator or started there. The intermediate resource is used to safeguard the migration in the event that one of the resources involved is no longer available during the migration; in this case, the intermediate resource can continue to be used in the form of an actuator and the completion of the migration can be postponed to the future. Once the migration is complete, the intermediate resource/actuator can be deleted from the graph or marked as inactive. The intermediate resource or corresponding actuator is optional; alternatively, data and processes can be moved directly from one actuator to another. By using the inheritance mechanism, migration is largely automatic from the user's point of view.

The inheritance already described concerns inheritance between classes and derived classes, for example the transfer of start/stop functions of a base class for a VM to a derived class for a VM of a concrete provider. In addition, inheritance can also occur between classes that have already been instantiated, i.e., actuators or components. An example of this is the use of scopes already described, for example, to define access rights to a resource: subordinate components inherit the access rights of the parent component, where the access rights can be at most as wide as those of the parent component/actuator. Another example is the display of traffic light colors (explained below), which is used in each actuator to reflect a current state of the corresponding resource. The state of an actuator may be inherited by those actuators that depend on that actuator, for example, by way of a "placed in" relationship (explained further below) indicating that the resource of one actuator is contained in the resource of another actuator. The state of the other actuator inherits to the one actuator in the sense that the state of the one actuator can be ranked at most as high as in the other actuator. This can be illustrated by appropriate coloring, so that, for example, a graph shown as a tree that contains a node with the state "Red" also colors all nodes red that are subordinate to this node. A change of a state, an access right, etc. at a node can directly affect those nodes/actuators that depend on the changed node/actuator.

Another particular embodiment relates to adapting the graph to observed characteristics of users (multi-tenancy). Users usually have different domain knowledge, interests, and skills, and the user interface disclosed herein may observe and analyze a user's interaction to determine these user characteristics. For example, which of the attributes of the actuators are viewed and/or used by a user may be observed. In one embodiment, component or actuator, as well as attributes, relations, or roles, may include a specific attribute in which conditions are defined to view the component/actuator, etc. in the first place. Such conditions may, for example, define a certain knowledge (skill) of a user, and may be compared to corresponding knowledge of the user. This requires that the knowledge for respective users is also defined, for example via data structures that are assigned to a current user and continuously updated based on his/her interests/activities on the graph. For example, if a user zooms into cost information, a knowledge "Cost" can be created or incremented for that user. Subsequently, those components of the graph for that user that require that knowledge are displayed; this may include a certain minimum value of the user's (incremented) knowledge. The conditions for such knowledge in an actuator etc. can be inherited by further actuators/components etc. that depend on the actuator by way of a relation, so that the extended or restricted display of graph components also affects these actuators/components etc.

The attributes can be assigned to different categories. For example, certain attributes may relate to specific costs or deadlines, technical information about performance or consumption, or the underlying code, etc. For a user who predominantly uses attributes of a particular category, in one embodiment, only the attributes of that category may be displayed, while others are placed in a less visually conspicuous manner (collapsed, hidden). Whether a user predominantly uses attributes of a category may be determined by counting his accesses to attributes of that category and comparing them to accesses to attributes of other categories. In one embodiment, the comparison may instead be made using a threshold value. Additionally or alternatively, the number of accesses per time period, such as per minute, may be recorded and compared.

With further reference to the customization of the application, it can be adapted to users by displaying not only individual attributes or categories of attributes, but entire areas of a graph in greater or lesser detail. The application creation process continuously records which nodes and which areas of the displayed graph are used by a user. The most frequently used areas may be displayed in (increasing) detail, for example with more detailed labels and/or indication of specific relationships, attributes, roles, etc., while the less frequently used areas may be displayed with less detail or with no detail at all and only as a dot or as a symbol. Alternatively, such areas may be displayed in greater detail where a malfunction has been detected, or such areas that contain a new piece of information relevant to a particular user based on previous accesses by that user. This display can be continuously adapted to the user's behavior, so that the user always sees those areas that are of interest to him. The remaining areas are suppressed so that a larger display area is available for the remaining areas of interest. Embodiments for customizing the application may advantageously be combined with the embodiments discussed above for displaying actuators and their information in conjunction with locations. For example, a user filming a facility by means of a mobile device may be shown by overlay those details of the facility that have previously been determined to be of interest to that user. The details determined to be interesting, i.e., frequently viewed, can be stored in the form of skills for the user, as explained earlier. In one embodiment, the skills/knowledge may be timestamped and decremented or removed after a certain duration in which the user did not view these details or viewed them less frequently. In summary, the same graph can be presented differently to different users and highlight or omit/suppress those parts of the graph that are used or not used by the user, respectively. As described earlier, the graphs shown are automatically adapted to the actions of a user and to interactions between actuators. In particular, the form of display depends on a current user and can be adapted to the user based on the user's usage, such as by observing those actuators, components, etc. that are most frequently used by the user; more frequently used elements are displayed in a more detailed view. Users can zoom in or out of the graph, so that specific parts of the graph are shown in more detailed or less detailed views as needed. The graph may further show resource consumption—memory space, processor utilization—or usage intensities—number of current users, actuator response times. For example, such properties can be selected by the user and the actuators colored to indicate specific utilization levels, etc. Alternatively, actuators with different utilization levels etc. can be displayed in different sizes.

With further reference to knowledge-based representations of a graph, while a user interacts with the graph, it can be determined which components/actuators as well as their properties the user interacts with. Subsequently, hints about these components/actuators and the properties in question, respectively, are stored. For example, a hint is a pointer variable to an actor/component/property. Alternatively, a hint can contain an identifier of an actuator/component/property, in particular also a combination of the same or a combination with a pointer variable. Such hints thus allow conclusions to be drawn about the user's knowledge and behavior. The hints can be stored in a dedicated actor that summarizes the user's knowledge. Alternatively, the hints may be stored in each actor/component/property with which the user interacts. In this case, the hint may also contain an identifier of the user. The hints are used to make the adjustments to the graph explained above, for example, omitting details or displaying them with greater detail.

When zooming in and out of a graph, in one embodiment, the displayed elements of actuators may be progressively reduced as the user zooms out or displays the actuators to users who are not interested in the details of those actuators because of their user behavior. Finally, in one embodiment, the displayed elements may be replaced with one of three color indicators (for example, traffic light colors) that summarize only the state of the actuator. For a resource that knows three states, for example active/inactive/switched off, the colors green/yellow/red can be assigned, for example. For a resource whose state is characterized by floating values, a range of these values can be divided into three ranges; for example, the remaining capacity of a memory, measured in percentage points, can be divided into the ranges 0 to below 33%, 33% to below 66%, and 66% to 100%, and the colors green, yellow, and red can be assigned to these ranges. Similarly, transfer rates of networks, utilization of processors or VMs, temperatures of certain machines, etc. can be color-coded.

To zoom into a graph, the user can make use of familiar user elements, such as scroll bars, buttons, key commands. As explained earlier, actuators and components are shown with more extensive details when zoomed in. As an alternative to user-controlled zoom, the level of detail can be automatically adjusted by having the application track which actuators/components are most frequently used by a particular user. For example, an actuator that is never viewed, selected, or zoomed in on by a user may be shown with only one of the aforementioned color codes.

In detailed zoom levels, actuators and components can show details of the utilization of these units, for example using graphical representations of these utilizations. In the case of a memory, a horizontal time axis can be displayed, on which the respective remaining capacity of the memory at past points in time is plotted. Similarly, the bit transfer rate of a network, the number of operations of a processor per second, or the temperature of a machine can be displayed. The information shown in such representations may be collected in the course of the interaction of the respective actuators/components with the underlying resources. In one embodiment, this takes the form of push messages from a server that monitors the resources for this purpose. Alternatively, requests may be made to the resources to obtain the data to be visualized. In one embodiment, the frequency of these requests is set to equal the refresh rate of a user's display, or at least to use an integer divisor of the refresh rate. As a result, the graphical display of the data is continuous and, from the user's perspective, completely delay-free.

The graph can be zoomed together with the displayed workspace and also moved (pan). These actions allow parts of the graph to be pushed sideways out of the displayed workspace so that they are no longer visible. The above-described queries to resources with the aim of showing individual actuators with corresponding state information can be automatically deactivated for non-visible actuators/components and reactivated when these actuators/components reappear.

In addition to the displayed graph, the workspace can also show a further view of the actuators/components contained therein, which displays a list of the actuators and—preferably as a tree structure—the components contained in each case. In one embodiment, the actuators and components can be selected in this list and thereupon highlighted (centered and/or shown in detail) in the graph; furthermore, in this case, a dialog window can be shown that also contains technical information about the respective actuator/component, which dialog window can be used by the user to set variables and parameters of the actuator/component.

In one embodiment, the user interface disclosed herein may be used to model and operate a building system. The graph displayed by the user interface may include an actuator representing a window in the building, the actuator including as components a drive of an electric blind, an alarm sensor, and a light sensor. Further, an actuator for a heating system may be included, wherein the actuator includes temperature sensor components. Further, an alarm system actuator and solar panel actuator may be included. Relationships may be defined between, for example, the window actuator and the heating system and the alarm system actuator and solar cell actuator. From such a representation, an application can be generated that communicates with the home electronics and defines and performs interactions between real components involved. The state of all real components is illustrated by the actuators and components of the user interface. For example, the window actuator can indicate whether the window is open. Furthermore, the electric blind component can be configured to close it.

With further reference to this embodiment, the process can be used to control the maintenance of said heating system. Thus, in the event of a defect, an actuator can be created for a service provider and the service provider can be allowed access to rooms of the heating system as a role. Overall, all previously described embodiments can be combined with the present embodiment, in particular the visualization of past states in image sequences, the adapted display of the graph for different users, and the highlighting of actuators/components of the graph when the device displaying the graph is directed to components of a real home electrical system with the movie function running (augmented reality).

Referring to the Drawings

FIG. 1 shows an exemplary workspace 100 containing a directed graph for modeling an infrastructure of resources. The workspace is part of a user interface. This user interface runs within a web browser or client application on a local device.

The graph shown consists of actuators 110 to 180 as nodes of the graph. For example, actuators 110 and 160 shown represent VMs, while actuators 120, 140, and 170 represent network areas (subnets). The edges of the graph represent relationships between the actuators. For example, an "is Using Config" relationship exists between actuators 140 and 150, illustrating that the subnet represented by actuator 140 uses a configuration of "aws project 1" represented by actuator 150. Individual actuators show a status, for example "running" in actuators 110 and 160, "healthy" in actuator 180, or "available" in actuator 120. Each of the actuators is also shown with a respective data type 112, 122, 132, 142, 152, 162, 172, 182, for example "AwsSubnetActor" in actuator 140 and "AwsVmActor" in actuator 110. Components included in the actuators are not shown in the present example.

Figure 2:
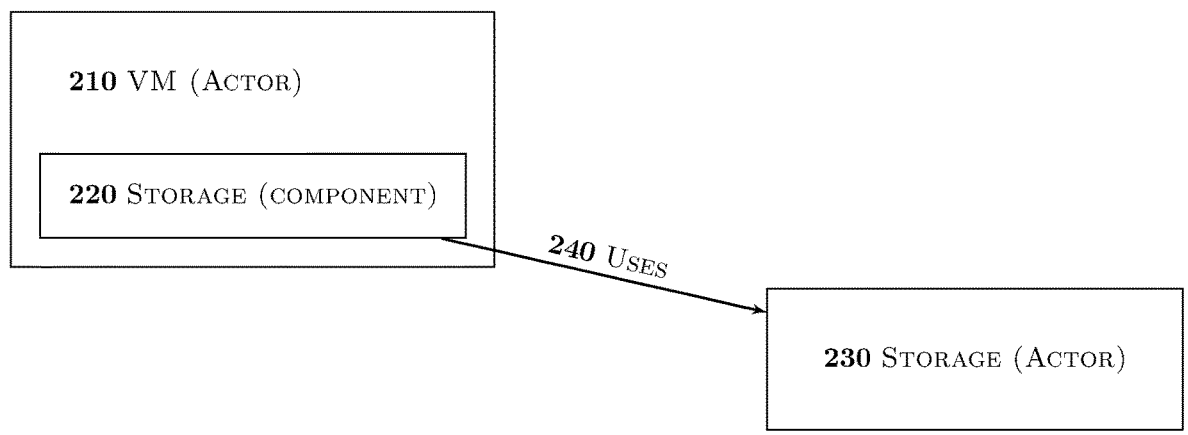
FIG. 2 shows an exemplary linkage between two actuators according to one embodiment of the invention.

A user can interact with the graph shown by using an input device to select and connect individual actuators or components or to invoke dialogs. FIG. 2 shows an example of two actuators 210 and 230, representing a VM and a memory device. The actuator 210 contains a variable called "memory", but this variable is initially unoccupied; for example, the variable may in principle be a variable of the data type used for the actuator "VM" and is initially shown as an empty variable (without a relationship edge) when such an actuator is created. A user may associate this variable with the actuator 230, such as by dragging the shown variable symbol to the memory 230, causing the application to associate the memory with the VM by showing the variable as a component of the actuator 210 and generating or copying the code necessary to access the memory. Also, the new relationship is indicated by the edge 240.

Figure 3A:
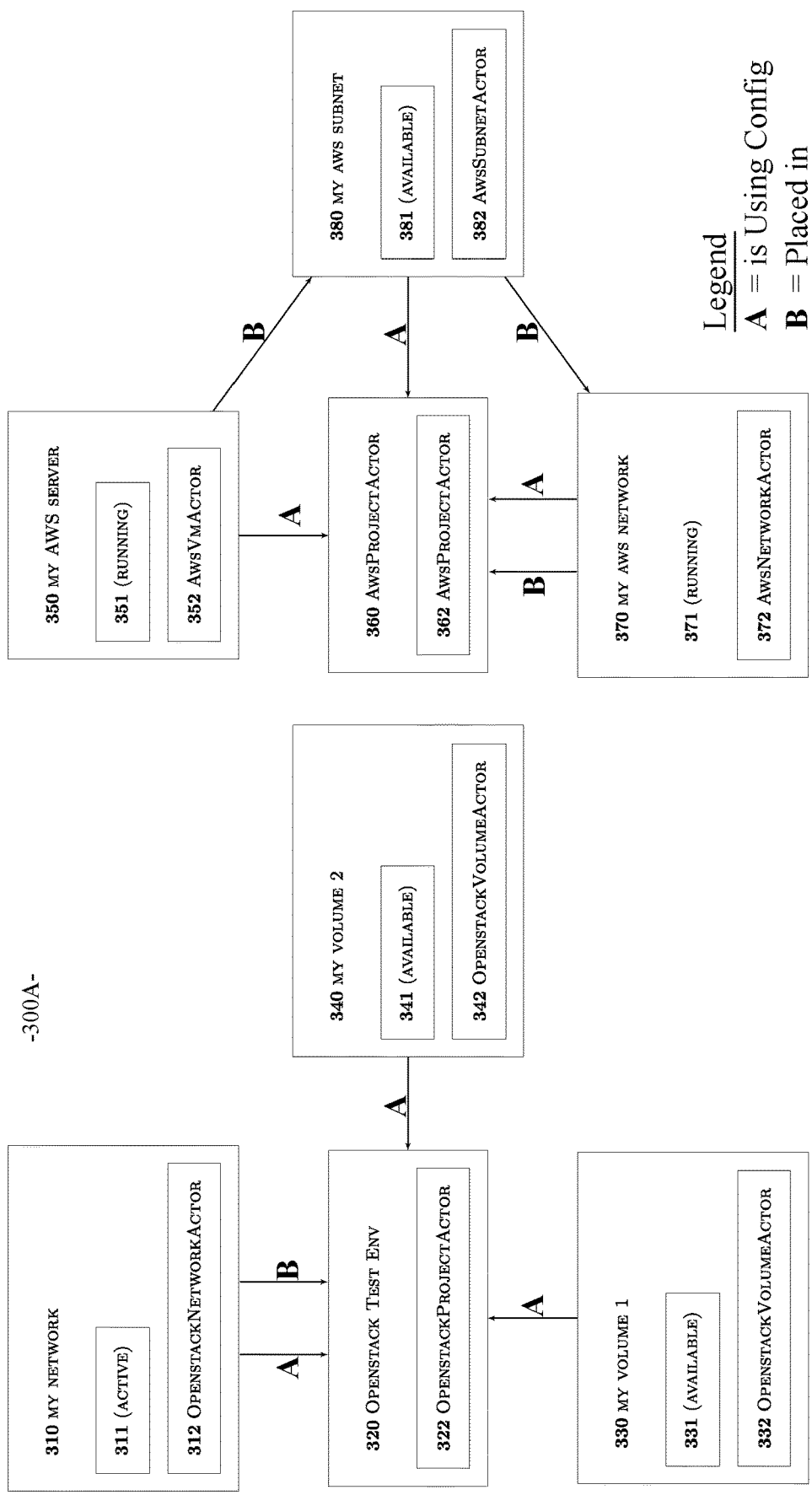
FIGS. 3A, 3B and 3C show further embodiments of the graphical user interface according to the invention.

In one embodiment, the actuators of a graph can be selectively arranged. FIG. 3A shows an example graph defining the use of virtual machines, servers, networks and storage volumes. Graph 300A consists of two subgraphs. The subgraph shown on the left includes actuators 310, 320, 330, and 340. Actuator 310 has type "OpenStackNetworkActor," as indicated by type variable 312. Actuator 310 contains a state variable 311; this indicates that actuator 310 is currently active.

Actuator 320 defines a test environment "Openstack Test Env" whose type variable 322 indicates the type "OpenstackProjectActor". This actuator is a higher-level unit with a configuration in the form of variables that can be used by further actuators. In this way, the need to configure other actuators belonging to the defined test environment identically is at least partially eliminated.

The actuators 330 and 340 represent a respective memory "My Volume 1" and "My Volume 2". Both actuators contain a state variable 331 and 341, respectively, which indicates the availability of the underlying memory ("available"). Both actuators 330 and 340 have the type "OpenstackVolumeActor" according to their type variable 332 and 342, respectively.

Actuators 310, 330, and 340 use settings stored in actuator 320, as indicated by arrows labeled "is Using Config" pointing from each of these actuators to project actuator 320, illustrating a scope relationship with that actuator. The network actuator 310 is part of the project defined by the actuator 320, as indicated by the arrow labeled "placed in".

FIG. 3A also shows a second subgraph consisting of actuators 350, 60, 3760, and 380. Actuator 350 is a cloud server named "My AWS Server" that is active ("Running") according to its state variable 351 and has type "AwsVMActor" according to its type variable 352. Furthermore, FIG. 3A shows an actuator 370 representing a network "My AWS Network", which according to its state variable 371 is also active and according to its type variable 372 has the type "AwsNetworkActor". Another actuator 380 "My AWS Subnet" defines a subnetwork of the network actuator represented by actuator 370. The actuator 380 is available according to its state variable 381 and belongs to the type "AwsSubnetAktor" according to its type variable 382. The actuator 360 "AwsProjectActor" defines a project whose components are the actuators 350, 370 and 380. Actuator 360 has the type "AwsProjectActor", as can be seen from its type variable 362. Actuators 350, 370 and 380 use settings of actuator 360, as shown by the arrows labeled "is Using Config". Further, the subnetwork represented by actuator 380 is part of the network represented by actuator 370. In turn, the server actuator 350 runs on the subnetwork 380, which is also shown by a "placed in" arrow.

In one embodiment, the arrangement shown in FIG. 3A is arbitrary; the application may allow arbitrary displacement and arrangement of actuators by the user, so that actuators may also overlap or completely cover each other. In one embodiment, the application allows arbitrary displacement of the actuators but prevents direct contact and overlapping of actuators; this may include, for example, continuously comparing the outer coordinates of an actuator undergoing displacement with outer coordinates of the other coordinates, as well as preventing further movement of the displaced actuator that would cause the actuator to overlap another actuator.

One embodiment of the invention allows for the purposeful arrangement of all actuators of a graph in order to display all actuators as clearly as possible and to both use space efficiently and clarify the structure of the graph. To this end, the application may provide a button, key combination, or other trigger that implements such an arrangement.

Figure 3B:
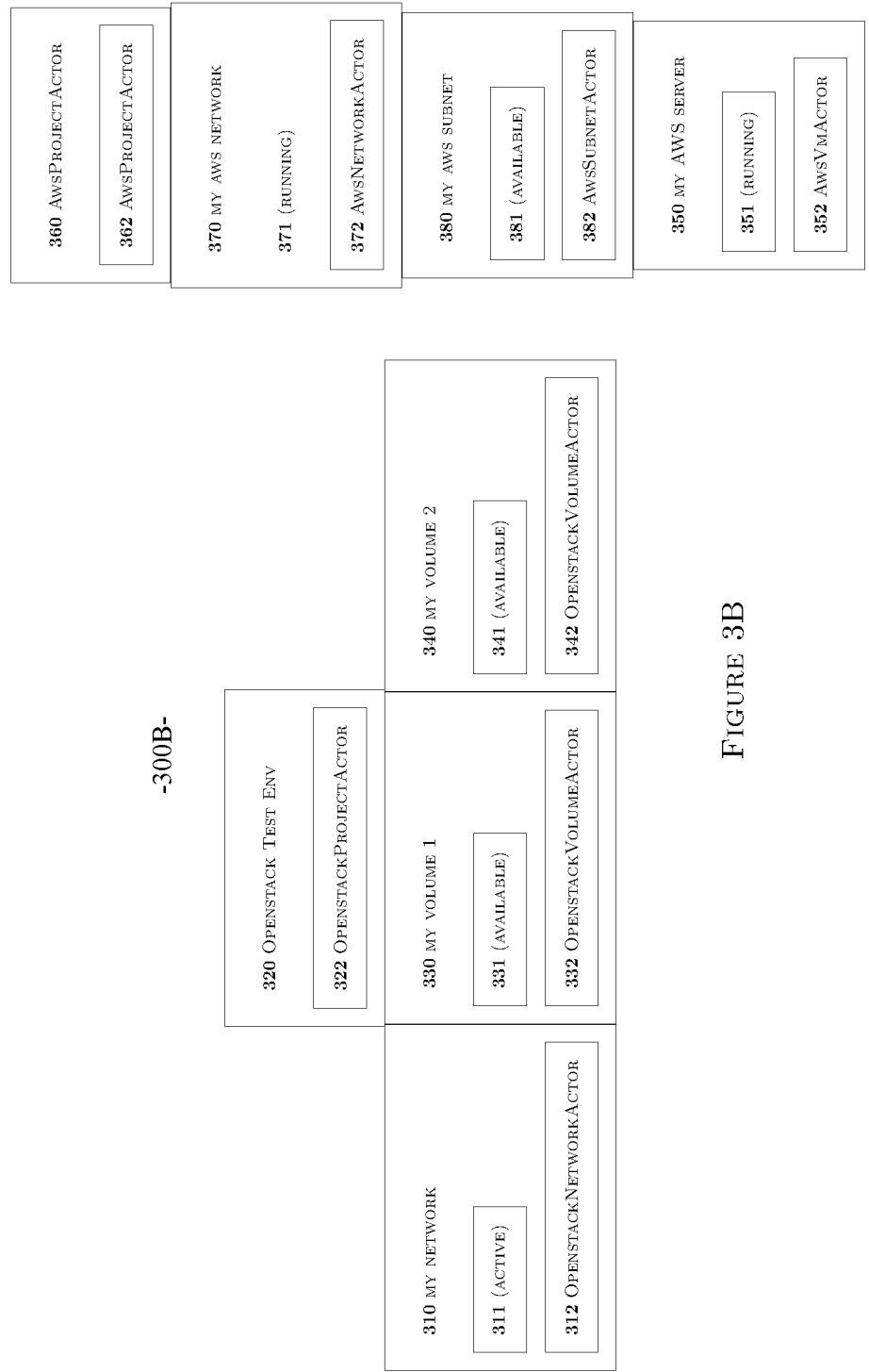

FIG. 3B shows the graph 300A in a new arrangement (grouping) 300B. This arrangement can be triggered by a user. The two subgraphs are shown approximately in the form of a respective tree, with the edges omitted. The root node of the left tree is project actuator 320, and the child nodes are actuators 310, 330, and 340. The right tree is shown with project actuator 360 as the root node, and contains child nodes 370, 380, and 350 at multiple levels. The edges can reappear immediately when the actuators are pulled apart from the positions shown by a user. The structure of the left subgraph results from the configuration and "placement" relationships shown: since actuators 310, 330, and 340 all use the configuration of test environment actuator 320, they can be readily represented as direct subnodes of actuator 320. In the right subgraph, all three actuators 350, 370 and 380 also use configurations of node 360, so a structure analogous to the left subgraph would be possible. However, in the example shown, the tree structure was created using the "placed in" relationships without considering the "Is Using Config" relationships. These "placed in" relationships result in the four node level representation form shown. The choice of a criterion for creating a tree structure can be specified by the user, for example by selecting one of several buttons or key combinations representing a respective criterion (here: "is using Config" or "placed in"). In this way, the user can display a structure that puts the respective criterion in the foreground and clearly displays a concrete infrastructure.

The described groupings of the elements of the graph as a tree form offer, among other things, the possibility to subject partial areas of the graph to a specific function. For example, the user can select a particular node/actuator of the graph, and the selection is automatically extended to all nodes/actuators that lie below the node selected by the user in the tree structure. On all selected nodes, the user may subsequently apply a function, such as determining a total utilization of the nodes, determining a total cost (charges for using virtual and physical machines and for using storage), determining a total consumption of energy, and others. The function may also include starting or stopping all selected nodes.

Figure 3C:
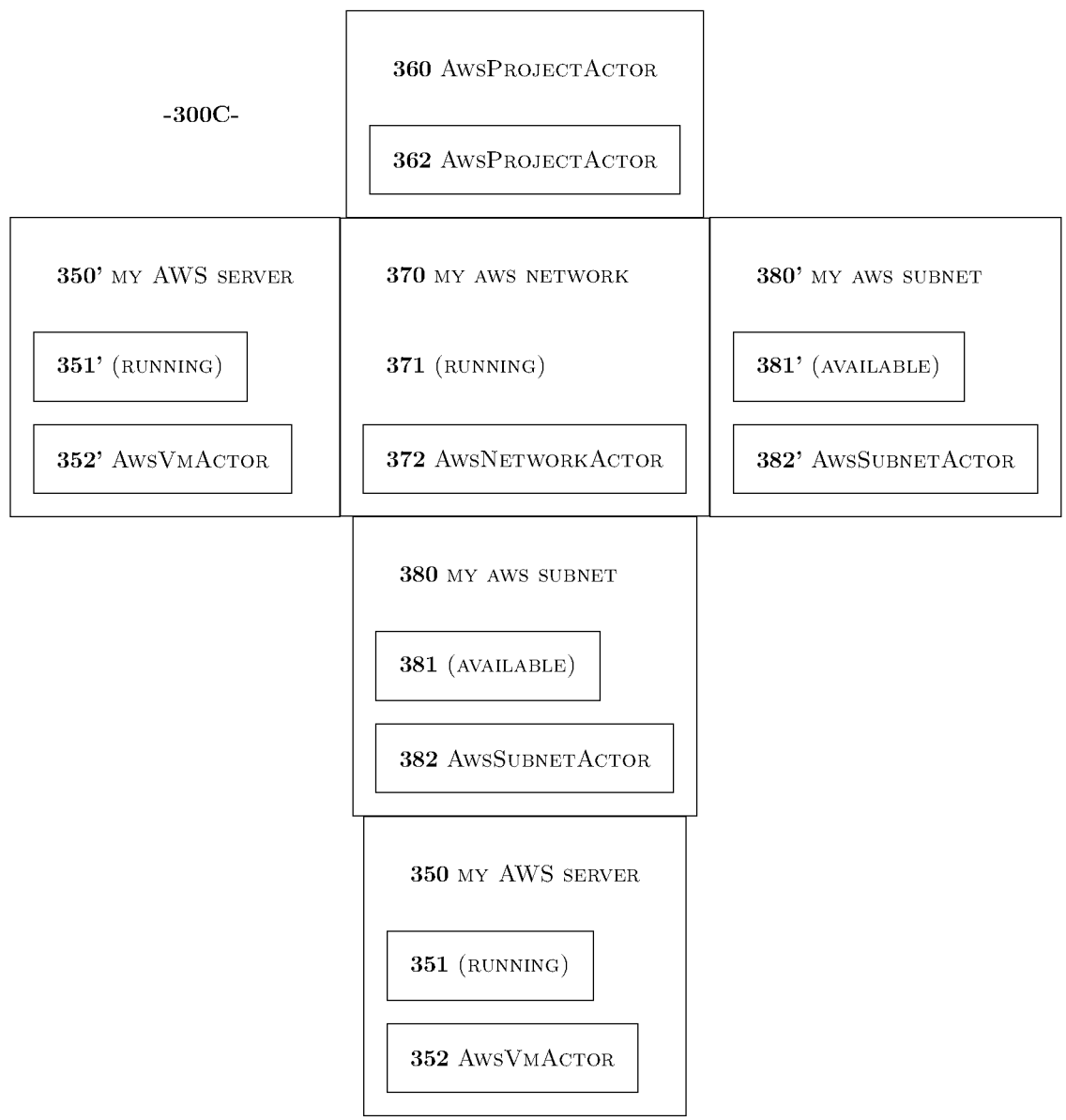

As explained earlier, users can select or define criteria that affect the tree structure ("placed in", "is Using Config", etc.). In one embodiment, the user may also select multiple criteria to be used to group the nodes. In this case, the application may first group the nodes according to a first of the criteria and enter the other criteria as arrows/directed edges; thus, the resulting structure may contain edges between nodes in the same level or between nodes in more distant levels, and is then not a tree in the strict sense. Alternatively, if multiple criteria are present, the application can arrange the graph as a tree using the first criterion and illustrate the further criteria by duplicating the nodes that satisfy the criterion. Such an example is shown in FIG. 3C. This example concerns the right subgraph from FIGS. 3A and 3B. As in FIG. 3B, nodes 360, 370, 380, and 350 are grouped based on the "is Using Config" criterion, resulting in a simple tree structure with four levels, each containing one node. In addition, grouping was done based on the "placed in" criterion. Here, the grouping according to the first criterion was kept and additionally individual nodes were duplicated; this concerns nodes that fulfill/contain the second criterion without this criterion already being apparent from the grouping. In the example shown, these are nodes 350 and 380, which are connected by means of "placed in" to nodes 380 and 370, respectively, as shown in FIG. 3A; however, these relationships are not apparent from the grouping shown in FIG. 3B. The nodes are duplicated as nodes 350' and 380' and are shown in FIG. 3C at the same tree level as node 370, since they depend directly on node 360 by means of the "is Using Config" criterion, as does node 370. FIG. 3C thus shows the dependencies of multiple criteria in a single tree structure.

Embodiments of the described automatic grouping of graphs also include the possibility of arranging the nodes of the graph not in a tree structure, but in the form of a matrix (grid, table). In one embodiment, a table may be displayed whose rows indicate the actuators and whose columns indicate the associated components. The user can return from the tree structure to a graph with complete display of all edges, for example by selecting a suitable button. If the tree structure contains duplicated nodes, these are removed from the view again and all criteria are displayed again in the form of respective edges.

Figure 4:
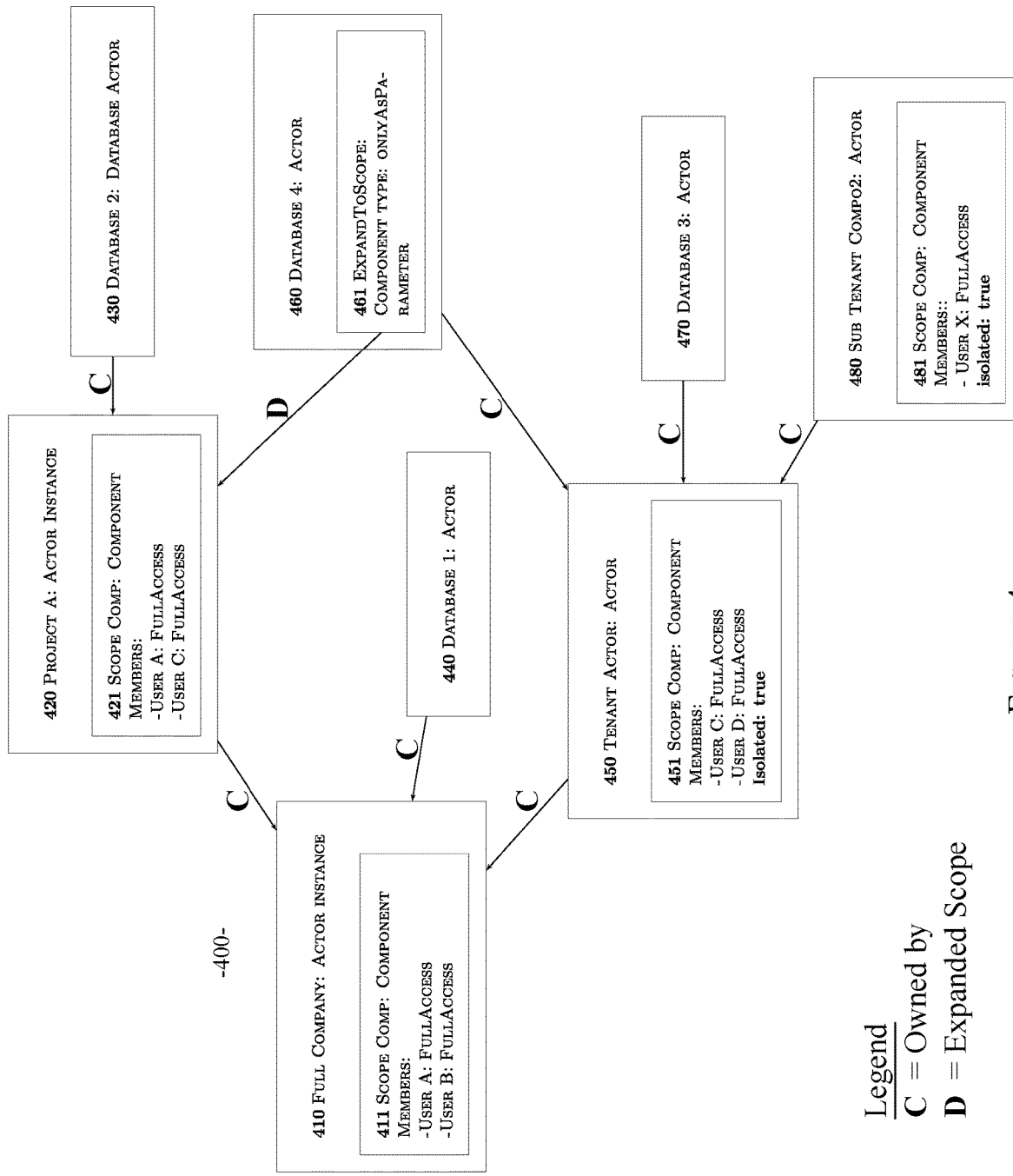
FIG. 4 shows a further embodiment according to the invention.

FIG. 4 shows an embodiment that illustrates the use of scopes. FIG. 4 shows exemplary actuators 410, 420, 430, 440, 450, 460, 470 and 480. Actuator 410 represents an entire company (Full Company) to which actuators 420, 440 and 450 are assigned; for these actuators, actuator 410 serves as the "owning" actuator (Scope) whose properties/properties are inherited by the named actuators. For example, the actuator 410 contains a component 411 (Scope Comp) that defines access rights (here: FullAccess) for two exemplary users A and B. The component 411 defines the access rights for the actuator 410. Actuators 420 and 450, which depend on the scope, include components 421 and 451, respectively, "inherited" from component 411. Component 421 additionally inherits access rights for user A; however, component 421 deviates from component 411 in that it records user C instead of user B; the deviation in this case may be due to a deliberate change in the user of the application. Similarly, the actuator 450 includes a component 450 derived from the component 411 of the actuator 410, but includes entirely different user rights.

The actuator 440, on the other hand, does not contain any component of the type in question. As a result, the access rights defined in actuator 410 automatically affect actuator 440 as well. Analogous to actuator 450, actuators 430 and 470 are shown, which also represent databases and depend here on actuator 420 and actuator 450 respectively as scope (sub-scope). For actuator 430, in the absence of other definitions/changes, the access rights of the superordinate scope actuator 420 apply, and thus complete access rights by users A and C. For actuator 470, the access rights of the higher-level scope actuator 450 apply, i.e. full access rights for users C and D. Actuator 460 also represents a database and contains a component 461 (ExpandToScope), which is set up by means of the setting "Component Type: OnlyAsParameter" and the edge "expanded scope" for actuator 420 with the effect that all access rights of the higher-level scope actuators 440 and 410 apply, i.e. full access rights for users A, B, C and D in this case. Actuator 480 depends on actuator 450 as a scope and inherits scope component 481 from the latter, but defines a user X in it that is not mentioned in either scope component 451 or the higher-level scope component 411 of actuator 410.

The graph 400 shows an overall representation of a company (actor 410) with a project (actor 420) and several databases 430, 440, 450, 460, 470 as well as two tenant actors 450 and 480. The tenant actors 450, 480 define for the users specified in the respective scope components 451 and 481 not only their access rights but also their skills/knowledge. In the present case, all of these users are marked as "Isolated: true"; this specification defines that each of the users is considered separately and thus knowledge is determined and stored separately for each user.

Technical Effects

The embodiments described here offer the possibility of planning infrastructures without a user having to restrict himself in advance to a specific provider and its technical specifications/API. Rather, an infrastructure can be created in the form of actors and components and relations with associated scopes, roles, and properties, and only subsequently added to or customized to work for a specific provider. This may also include adapting an already created infrastructure to the technical specifications of multiple providers. This process can be supported by the invention by automatically filling in certain data fields of the actuators/components. For example, the process described may include steps that determine supplemental values based on user selections/inputs already made. For example, if the user has already specified a specific provider in an actuator/component, certain values that are already in other actuators/components in combination with that provider or are available to the process from predetermined entries can be entered into the actuator/component in question.

The format of a graph chosen for the creation of infrastructures and their user interfaces, as well as the ways described for changing and extending the graph and its functionality, provides the user with a versatile representation and extensibility, as well as clear and simple modification of a model for an infrastructure and, at the same time, the programming of accesses to this infrastructure. The representation is extensible especially due to the use of inheritance in components and actuators, where inheritance is used across programming languages.

What is claimed is:

1. A computer-implemented method comprising:
   displaying a graphical user interface that displays symbols for actuators and components for selection and creation of a graph by a user, wherein the actuators represent resources of a provider, and the components contain, as components of the actuators, technical implementations for interaction with programming interfaces of one or more providers of the resources, wherein the components are implemented as ontological classes containing declarative definitions of properties of the respective component;
   wherein, in response to the user selecting a new actuator, the actuator is represented as a node in the graph, and wherein, in response to selecting a new component for an actuator in the graph, contact is made with the resource for the actuator that receives the new component, and wherein the actuator and/or the components of the graph indicate technical properties of the resources and indicate user elements that enable the user to access the resources through functionalities of the components; and
   wherein, in response to the user selecting at least two actuators, user elements are displayed enabling the user to define a technical relationship exerted by one or more of the selected actuators on one or more other of the selected actuators, wherein the technical relationship is displayed as one or more edges between the actuators, and wherein, in response to selecting a new component for an actuator in the graph, contact is made with a resource represented by an actuator in the graph.

2. The computer-implemented method of claim 1, wherein the user is enabled to derive, for a new actuator or component from a selectable ontological class, a new ontological class that inherits the properties of the selectable ontological class, and wherein the user is further enabled to customize and/or augment the derived ontological class by means of user elements for inputting text.

3. The computer-implemented method according to claim 1, wherein the technical relationships between two actuators and/or components indicate that properties of one or more of the actuators and/or components are transferred to these actuators/components for the actuators/components depending on these actuators/components in a technical relationship, as far as these have analog data structures storing properties accordingly, and wherein the change of a property in an actuator/component is automatically transferred to all actuators/components depending on this actuator/component in a technical relationship.

4. The computer-implemented method of claim 3, wherein the properties comprise components, attributes, functions, or data structures.

5. The computer-implemented method of claim 3, wherein the change is based on a status change of a resource or a change by a user.

6. The computer-implemented method according to claim 1, wherein the user is enabled to interact with the actuators and/or components of the graph, wherein interacting comprises adding, exploring, editing, removing, and/or using actuators/components to control underlying resources.

7. The computer-implemented method of claim 6, further comprising: Determining those components and/or actuators and/or properties thereof with which the user interacts;
   storing hints to the determined components/actuators/properties, in particular data types and/or knowledge areas of the same.

8. The computer-implemented method of claim 7, wherein storing the hints is done in an actuator representing the knowledge of that user.

9. The computer-implemented method of claim 7, further comprising adapting the graph based on the stored hints, wherein the adapting comprises, for a current user, determining the stored hints, comparing them to the displayed components of the graph, and displaying in greater detail those components that match the hints.

10. The computer-implemented method of claim 9, wherein hints and components of the graph match when the data contained in one of the components matches at least one of the hints, in particular wherein the hints contain data types that match or are compatible with data types of the components.

11. The computer-implemented method of claim 7, wherein storing the hints comprises incrementing a variable representing a knowledge area or data type of an actuator or component, and wherein a level of detail of components of the graph is adjusted based on a check of whether a hint containing a value that is above a predetermined threshold has been stored for a respective data type or knowledge area of the component.

12. The computer-implemented method according to claim 1, further comprising:
- obtaining a command invoked by the user to automatically align the actuators of the graph; and
- aligning the actuators in the form of a tree structure, wherein the root node of the tree is formed by an actuator which does not depend on any other actuator, and wherein the nodes of lower tree levels are arranged on the basis of the respective dependency with regard to a technical relationship of the nodes/actuators to higher-level nodes/actuators.

13. The computer-implemented method according to claim 1, wherein the resources comprise one or more physical servers, virtual machines as well as physical actuators, sensors and further components of a building automation, and/or machines, in particular robots, in a manufacturing plant.

14. The computer-implemented method according to claim 1, wherein the components have a particular data type and contain one or more attributes and/or variables representing an internal state of the respective component, in particular wherein the internal state comprises one or more indications concerning inputs and outputs, power consumption or compatibility with a standard, and wherein each of these indications also has a respective data type.

15. The computer-implemented method according to claim 1, wherein the actuators comprise components and the components of an actuator comprise the technical implementations for interacting with programming interfaces of the resources defined by the actuator.

16. The computer-implemented method of claim 4, wherein displaying the graphical user interface comprises displaying graphical user elements that enable the user to define technical implementations for individual components.

17. The computer-implemented method according to claim 1, further comprising:
- logging of all changes to the graph by the user and to the underlying resources, including saving a timestamp; and
- representing a sequence of states of the user interface in an image sequence showing the graph in the respective states, and restoring a past state of the graph and the corresponding configuration in response to a command from the user to jump to a particular point in time in the image sequence.

18. The computer-implemented method according to claim 1, further comprising:
- receiving a request from an actuator to make a change in the configuration of the actuator;
- displaying a current state of the graph and a state of the graph after making the change; and
- in response to a command from the user, make or ignore the change.

19. The computer-implemented method of claim 18, further comprising:
- logging the change and the command;
- wherein displaying the current state and the state after making the change is done under the condition that previously logged changes had been rejected by commands of the user.

20. The computer-implemented method according to claim 1, further comprising:
- logging utilization of resources represented by the graph, and detect a malfunction when a utilization deviates from a mean utilization by a threshold; and
- restarting actuators with malfunction, in particular moving the startup to a period when the utilization is lowest according to the logged data.

21. The computer-implemented method according to claim 1, further comprising:
- by a first actuator, Assigning a role to a second actuator, the role comprising a definition of an action that the second actuator can apply to further actuators.

22. The computer-implemented method of claim 21, wherein the assigning is performed manually based on an instruction by the user.

23. The computer-implemented method of claim 21, wherein the assigning is performed automatically by the first actuator in response to assigning the role to the first actuator by a third actuator.

24. The computer-implemented method of claim 1, wherein one or more actuators are operated in real time.

25. A computer-readable medium having instructions stored thereon which, when executed by a processor, perform the method of claim 1.

* * * * *

UNITED STATES PATENT AND TRADEMARK OFFICE
CERTIFICATE OF CORRECTION

PATENT NO. : 12,260,075 B2
APPLICATION NO. : 18/328043
DATED : March 25, 2025
INVENTOR(S) : Arne Schmieg Page 1 of 1

It is certified that error appears in the above-identified patent and that said Letters Patent is hereby corrected as shown below:

On the Title Page

Column 1 Item (71) Applicant: German Edge Cloud GmbH & Co. KG should be --Rittal GmbH & Co. KG--

Column 1 Item (73) Assignee: German Edge Cloud GmbH & Co. KG should be --Rittal GmbH & Co. KG--

Signed and Sealed this
Twenty-second Day of April, 2025

Coke Morgan Stewart
*Acting Director of the United States Patent and Trademark Office*